United States Patent
Hu

(10) Patent No.: US 9,160,264 B2
(45) Date of Patent: Oct. 13, 2015

(54) INITIAL ROTOR POSITION DETECTION AND START-UP SYSTEM FOR A DYNAMOELECTRIC MACHINE

(75) Inventor: Jun Hu, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 2322 days.

(21) Appl. No.: 11/941,125

(22) Filed: Nov. 16, 2007

(65) Prior Publication Data

US 2009/0128074 A1 May 21, 2009

(51) Int. Cl.
| | |
|---|---|
| H02P 1/26 | (2006.01) |
| H02P 6/20 | (2006.01) |
| H02P 6/18 | (2006.01) |
| H02P 21/00 | (2006.01) |

(52) U.S. Cl.
CPC ............. *H02P 6/205* (2013.01); *H02P 6/183* (2013.01); *H02P 21/0032* (2013.01); *H02P 21/0053* (2013.01); *H02P 2203/11* (2013.01)

(58) Field of Classification Search
USPC .......... 318/400.01, 400.32, 400.33, 700, 718, 318/738, 781, 778
See application file for complete search history.

(56) References Cited

U.S. PATENT DOCUMENTS

| | | | |
|---|---|---|---|
| 4,368,418 A | 1/1983 | DeMello et al. | |
| 5,055,764 A | 10/1991 | Rozman et al. | |
| 5,068,590 A | 11/1991 | Glennon et al. | |
| 5,097,195 A | 3/1992 | Raad et al. | |
| 5,107,195 A | 4/1992 | Lyons et al. | |
| 5,291,115 A | 3/1994 | Ehsani | |
| 5,461,293 A | 10/1995 | Rozman et al. | |
| 5,525,887 A | 6/1996 | Van Sistine | |
| 5,537,019 A | 7/1996 | Van Sistine et al. | |
| 6,137,258 A | 10/2000 | Jansen | |
| 6,163,127 A * | 12/2000 | Patel et al. | 318/700 |
| 6,441,572 B2 | 8/2002 | Batzel | |
| 6,498,449 B1 | 12/2002 | Chen et al. | |
| 6,603,226 B1 | 8/2003 | Liang et al. | |
| 6,762,573 B2 | 7/2004 | Patel | |
| 6,924,617 B2 * | 8/2005 | Schulz et al. | 318/701 |
| 6,967,461 B1 | 11/2005 | Markunas et al. | |
| 6,996,482 B2 | 2/2006 | Kunz et al. | |
| 7,034,497 B2 * | 4/2006 | Markunas et al. | 318/400.33 |

(Continued)

FOREIGN PATENT DOCUMENTS

JP 2007037274 A 2/2007

OTHER PUBLICATIONS

Der-Fa Chen et al: "Design and Implementation of a Sensorless PMSM Drive Including Standstill Starting," Industrial Electronics Society, 2004. IECON 2004. 30th Annual Conference of IEEE Busan, South Korea, Nov. 2-6, 2004, Piscataway, NJ, USA, IEEE. vol. 1, Nov. 2, 2004, pp. 987-992, XPO10799769, DOI: 10.1109/IECON.2004.1433450, ISBN: 978-0-7803-8730-0 *pp. 988-990; figure 1*.

(Continued)

*Primary Examiner* — Kawing Chan
(74) *Attorney, Agent, or Firm* — Carlson, Gaskey & Olds

(57) ABSTRACT

A method for detecting an initial rotor angular position and starting a dynamoelectric machine having a stator and a rotor includes the steps of driving the dynamoelectric machine into partial magnetic saturation to determine the initial rotor angular position of the dynamoelectric machine, and starting the dynamoelectric machine utilizing the initial rotor angular position previously determined.

19 Claims, 3 Drawing Sheets

(56) References Cited

U.S. PATENT DOCUMENTS

| | | |
|---|---|---|
| 7,072,790 B2 | 7/2006 | Hu et al. |
| 7,443,130 B2 | 10/2008 | Takao et al. |
| 7,652,441 B2 | 1/2010 | Ying Yin Ho |
| 2002/0171389 A1* | 11/2002 | Nakazawa .................... 318/811 |
| 2005/0151502 A1* | 7/2005 | Quirion ........................ 318/715 |
| 2006/0052972 A1* | 3/2006 | Hu et al. ....................... 702/147 |
| 2006/0290304 A1* | 12/2006 | Marcinkiewicz et al. .... 318/432 |

OTHER PUBLICATIONS

Extended European Search Report for Application No. EP 08 25 3745 dated Feb. 17, 2012.

* cited by examiner

INITIAL ROTOR POSITION DETECTION AND START-UP SYSTEM FOR A DYNAMOELECTRIC MACHINE

BACKGROUND OF THE INVENTION

This disclosure relates to a dynamoelectric machine, and more particularly to a rotor angular position and start-up system for a dynamoelectric machine.

In aeronautical applications, it is desirable to use a single machine as both a starter (to start an engine) and a generator (to supply electricity). For example, an aircraft may utilize a single motor to both start an engine and to generate electricity. In another example, an integrated electrical motor may be utilized for starting and driving a fan, compressor, pump, etc., of an aircraft. The motor is sometimes called a dynamoelectric machine because of its dual functionality as a starter and generator. A typical dynamoelectric machine includes a stationary stator and a rotating rotor. The dynamoelectric machine may also include a permanent magnet. Dynamoelectric machines having a permanent magnet are classified into two types: interior buried permanent magnetic motors and surface mounted permanent magnetic motors. In an interior buried permanent magnetic motor, the magnet is buried within the interior of the rotor. Surface mounted permanent magnetic motors are also known that include a magnet that is mounted radially outward from the exterior surface of the rotor.

In some motors, it is necessary to detect a position of the rotor in order to sustain operation of the motor during start-up. The initial rotor angular position is necessary to ensure that the rotor spins in the correct direction to avoid damaging the bearings of the parts being driven by the dynamoelectric machine. Determining an initial rotor angular position typically requires a shaft mechanical sensor that is coupled to a rotor shaft of the rotor. However, in some applications it is not feasible to install a shaft mechanical sensor onto the rotor. Additional benefits of a sensorless control of a dynamoelectric machine include reduced weight, reduced cost and overall reliability improvement of the dynamoelectric machine.

Methods for the sensorless detection of rotor angular position are known. For example, a back EMF method and a carrier injection approach are used to determine an initial rotor angular position prior to start-up. The back EMF method determines the rotor position based on voltage and works well at a high angular rotor velocity. The carrier injection approach explores the spatial saliency of the rotor to determine an initial rotor position. An alternating voltage or current is communicated to the dynamoelectric machine and the resulting current or voltage is measured and analyzed to decode the rotor position information in the carrier injection approach. Both the EMF method and the carrier injection method are effective for interior buried permanent magnetic motors. Disadvantageously, however, neither of these methods has proven effective for a surface mounted permanent magnetic motor. Surface mounted permanent magnetic motors are generally preferred over interior buried permanent magnetic motors because of their ease of manufacturability.

Accordingly, it is desirable to provide an improved rotor angular position and start-up system for sensorless control of a dynamoelectric machine.

SUMMARY OF THE INVENTION

A method for detecting an initial rotor angular position and starting a dynamoelectric machine having a stator and a rotor includes the steps of driving the dynamoelectric machine into partial magnetic saturation to determine the initial rotor angular position of the dynamoelectric machine, and starting the dynamoelectric machine utilizing the initial rotor angular position previously determined.

A method for detecting an initial rotor angular position of a dynamoelectric machine includes the steps of supplying a voltage to each of a plurality of windings of the dynamoelectric machine while at standstill, measuring a current associated with the voltage of each of the plurality of windings, filtering the measured currents, and applying a phase locked loop to each current filtered to estimate the initial rotor angular position.

A rotor angular position and dynamoelectric machine start-up system includes a power inverter and a microcontroller. The power inverter supplies a voltage to the dynamoelectric machine. The microcontroller is programmed with a plurality of algorithms that drive the dynamoelectric machine into partial magnetic saturation to derive an initial rotor angular position of the dynamoelectric machine.

The various features and advantages of this disclosure will become apparent to those skilled in the art from the following detailed description. The drawings that accompany the detailed description can be briefly described as follows.

DETAILED DESCRIPTION OF THE DISCLOSED EMBODIMENT

Figure 1:
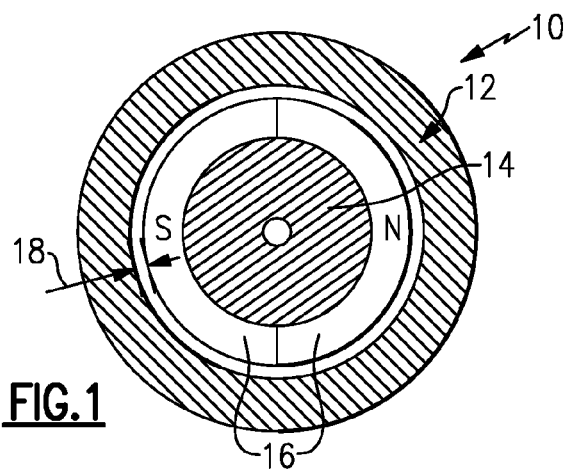
FIG. 1 illustrates an example surface mounted permanent magnetic motor.

FIG. 1 illustrates an example dynamoelectric machine 10. In this example, the dynamoelectric machine 10 is a surface mounted permanent magnetic motor. The dynamoelectric machine 10 can operate as a starter to start an engine, for example, or as a generator to power a load. For example, the dynamoelectric machine 10 may be utilized to operate and control an aircraft engine, fan, compressor, pump or the like. The dynamoelectric machine 10 includes a stator 12, a rotor 14 and a magnet 16 mounted to the exterior surface of the rotor 14. An air gap 18 extends between the stator 12 and the magnet 16. The dynamoelectric machine 10 does not include a shaft mechanical sensor such that the position of the rotor must be detected to operate the machine 10 when at standstill. Although the example methods and illustrations disclosed herein are described in relation to a surface mounted magnetic motor, it should be understood that any type of dynamoelectric machine may benefit from the teachings of this disclosure.

Figure 2:
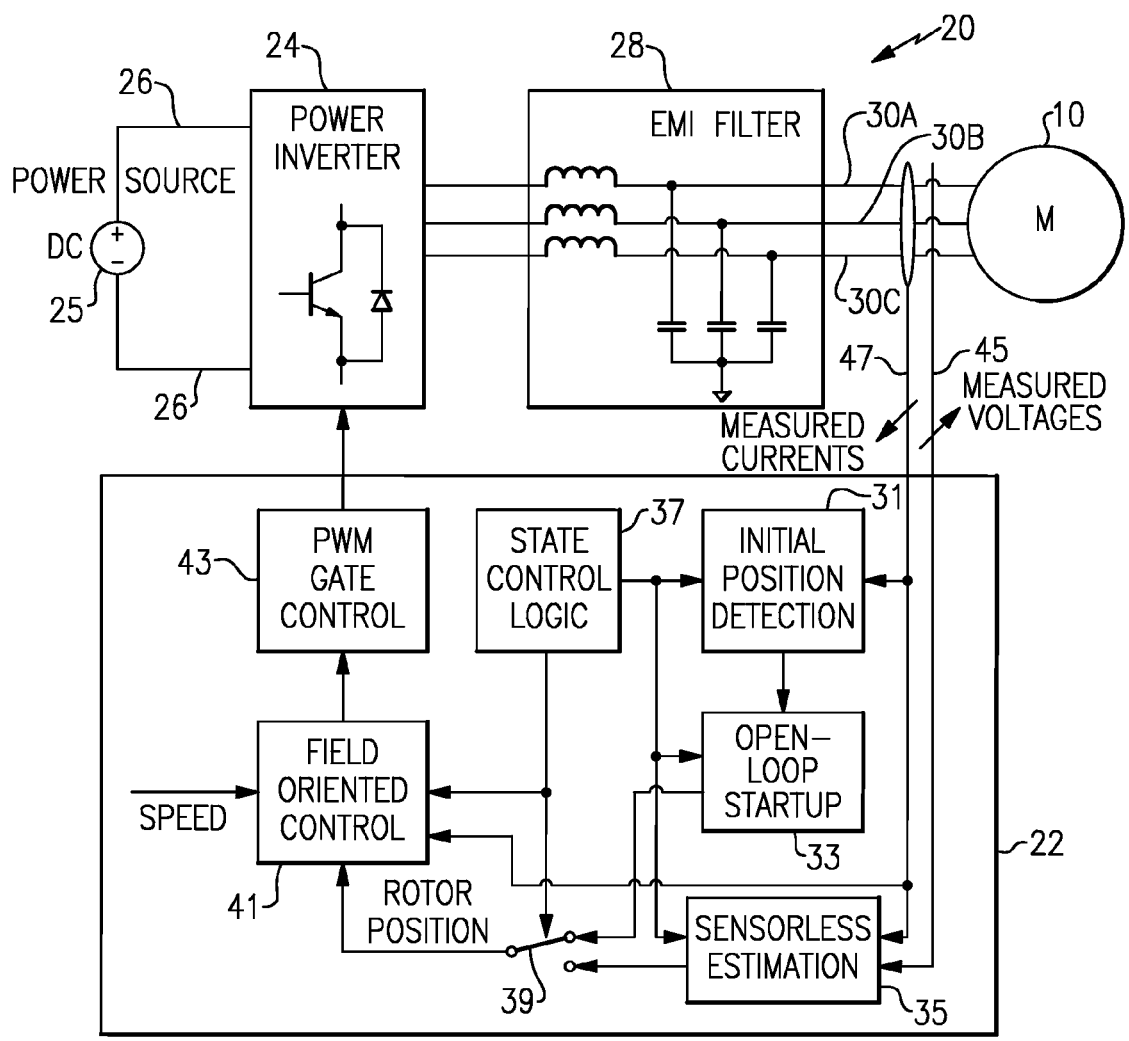
FIG. 2 illustrates a block diagram of a rotor angular position and start-up system for a dynamoelectric machine.

FIG. 2 illustrates an example rotor angular position detection and start-up system 20 for the dynamoelectric machine 10 illustrated in FIG. 1. The rotor angular position and start-up system 20 is operable to drive the dynamoelectric machine 10 into partial magnetic saturation to estimate the rotor angular position of the dynamoelectric machine 10 when at standstill. The rotor angular position information may be used to open-loop start the dynamoelectric machine 10, in one example. Open-loop start-up occurs where the speed and position of the rotor is unknown and cannot be utilized to control the speed of the stator.

Magnetic saturation occurs where the magnetic field density is too high for a magnetic core such as iron. The magnetic permeability drops as the core material becomes saturated resulting in a lower inductance than that of a non-saturated core. The magnetic saturation can be produced by the permanent magnet 16, by the winding currents in the stator 12, or by both. In one example, a three-phase AC voltage is applied to the stator 12 while the dynamoelectric machine 10 is at standstill to drive the dynamoelectric machine 10 into partial magnetic saturation. A high frequency AC voltage, such as a 400 Hz voltage, is utilized to avoid mechanical rotation that may be caused by the injected three-phase voltage, for example.

The magnitude of the three-phase voltage is properly controlled so that it can generate enough current to introduce magnetic saturation, yet is low enough not to cause movement of the rotor 14. The magnetic field generated by the three-phase high frequency voltage rotates about the stator 12 in a circle. When the circling magnetic field aligns with a permanent magnetic field of the rotor 14 in the same direction, the total magnetic flux density at that location becomes high and saturation occurs. As a result, a second harmonic component of a spatial current that contains the desired rotor angular position information may be extracted, as is further discussed below.

FIG. 2 illustrates how a microprocessor 22 of the rotor angular position and start-up system 20 utilizes magnetic saturation of the dynamoelectric machine 10 to extract the rotor angular position of the rotor 14. The system 20 includes the dynamoelectric machine 10, the microprocessor 22, a power inverter 24, and an EMI filter 28. In one example, the EMI filter is optional.

A DC power supply 25 provides power to the inverter 24. The inverter 24 converts a DC voltage from DC voltage supply lines 26 to AC to generate the three-phase AC voltage that is used to drive the stator 12 of a dynamoelectric machine 10. In one example, the inverter 24 is a motor controller. In one example, the three-phase voltage is communicated through the EMI filter 28, which improves power quality by filtering out harmonics and reducing electromanic interference (EMI). The AC voltage from windings 30A, 30B and 30C then flows to the dynamoelectric machine 10 to sustain operation of the dynamoelectric machine 10.

The microcontroller 22 performs several algorithms for extracting the initial rotor angular position information and operating the dynamoelectric machine 10. The microcontroller 22 includes several blocks for processing the algorithms including an initial position detection block 31, an open-loop start-up block 33, a sensorless estimation block 35, a state control logic block 37, a selector switch 39, a field oriented control (FOC) block 41 and a PWM gate control block 43.

The microprocessor 22 measures the voltages and currents communicated in signal paths 45, 47 for initial rotor angular position detection and start-up of the dynamoelectric machine 10. Before driving the dynamoelectric machine 10, the initial position detection block 31 is activated to estimate the initial rotor angular position. The initial rotor angular position is calculated and communicated to the open-loop start-up block 33. The open-loop start-up block 33 then starts the dynamoelectric machine 10 and spins the machine 10 in the correct direction. The sensorless estimation block 35 utilizes an estimated position for the FOC block 41. The state control logic block 37 determines which block is used for controlling the motor at various stages of operation. The PWM gate control block 43 generates the switching patterns for the inverter 24 to produce desired output voltages to the dynamoelectric machine 10.

Figure 3:
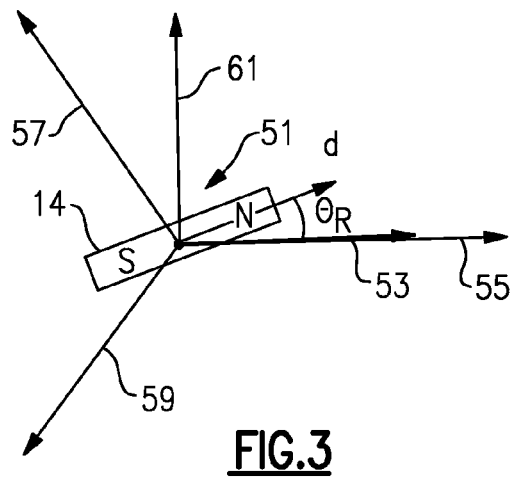
FIG. 3 illustrates how a stationary frame of the system of FIG. 2 aligns with multiple phases of an applied alternating current.

The algorithm utilized to extract the initial rotor angular position information is now described with reference to FIG. 3. The three-phase voltage applied to the dynamoelectric machine 10 can be expressed by the following equation:

$$V_a = V_{S1} \cdot \cos(\omega_i t + \pi/2)$$

$$V_b = V_{S1} \cdot \cos(\omega_i t + \pi/2 - 2\pi/3)$$

$$V_c = V_{S1} \cdot \cos(\omega_i t + \pi/2 + 2\pi/3) \quad \text{Eq. 1}$$

The three phase voltage described by Eq. 1 can also be expressed in space vector form. The transformation from an a-b-c frame (three-phase) to an alpha-beta (α-β) stationary frame is described in the following equation:

$$\begin{bmatrix} V_\alpha \\ V_\beta \end{bmatrix} = \frac{2}{3} \begin{bmatrix} 1 & -1/2 & -1/2 \\ 0 & \sqrt{3}/2 & -\sqrt{3}/2 \end{bmatrix} \begin{bmatrix} V_a \\ V_b \\ V_c \end{bmatrix} \quad \text{Eq. 2}$$

where V can be replaced with current or flux;
a, b and c represent the phases of voltage on the windings 30A, 30B and 30C in the a-b-c frame; and
α and β represent axes of the α-β frame and Vs1 is the magnitude of the voltage.

The variables $V_\alpha$ and $V_\beta$, in equation number 2 can represent a complex number where the α axis is considered the real axis and the β axis is considered the image axis. According to Euler's formula, the above complex number ($V_\alpha + jV_\beta$) can be expressed as an exponential function:

$$V_{s\_\alpha\beta} = V_{s1} \cdot e^{j(\omega_i t + \pi/2)} \quad \text{Eq. 3}$$

where e is the base of the natural logarithm, and j is the imaginary unit.

Equation 3 represents a vector rotating at an angular speed $\omega_i$, with its initial angle π/2 from the real axis (or alpha-axis).

The alpha-beta (α-β) stationary frame 51 comprises an α-axis 53 and a β-axis 61 that are perpendicular to one another. The alpha-beta (α-β) stationary frame 51 aligns with a first phase 55, a second phase 57 and a third phase 59 system 20. The rotor 14 rotates, and its displacement from the α-axis 53 is shown by the angle $\theta_r$, which is the rotor angular position to be estimated (See FIG. 3).

A three-phase current ($i_a$, $i_b$ and $i_c$) can also be measured through current sensors and is delivered to the microcontroller 22 for estimating the initial rotor angular position. In most cases, these currents are already measured and used by the power inverter 24 and the field oriented control block 41. The three-phase currents can also be expressed as a space vector in exponential function. The following equation represents the current vector that responds to the voltage represented by equation 3:

$$I_{s\_\alpha\beta} = I_{sp1} \cdot e^{j(\omega_i t)} + I_{sp2} \cdot e^{j(2\omega_i t - \theta_r)} \quad \text{Eq. 4}$$

From this equation, it is apparent that the second current harmonic contains the rotor position $\theta_r$.

Figure 4:
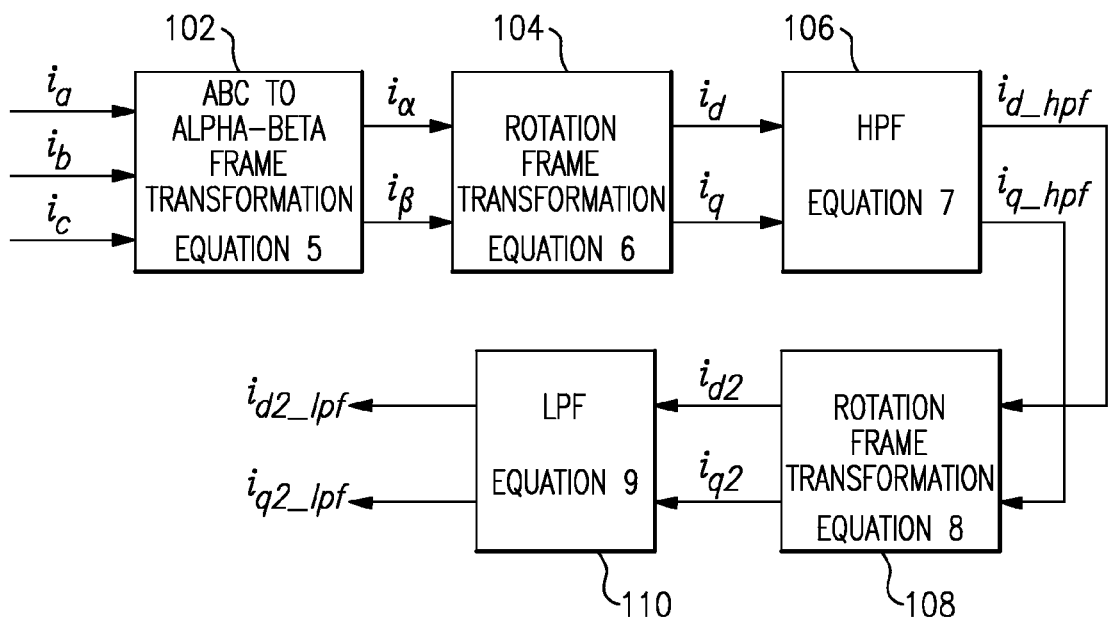
FIG. 4 illustrates a block diagram of operations performed within the system of FIG. 2 to extract rotor angular position information.

Referring to FIG. 4, and with continuing reference to FIG. 2, the second harmonic that contains the rotor position $\theta_r$ may be effectively extracted from Equation 4 to determine the rotor angular position information from the measured three-phase currents $i_a$, $i_b$ and $i_c$. After the three phase currents $i_a$, $i_b$ and $i_c$ are measured, a current vector is created in the α-β frame through a similar transformation as that applied to the voltages by Equation 2 at step block 102. The relationship between the α-β frame and the a, b, c frame with respect to the currents $i_a$, $i_b$ and $i_c$ is described in the following equation:

$$\begin{bmatrix} I_\alpha \\ I_\beta \end{bmatrix} = \frac{2}{3} \begin{bmatrix} 1 & -1/2 & -1/2 \\ 0 & \sqrt{3}/2 & -\sqrt{3}/2 \end{bmatrix} \begin{bmatrix} I_a \\ I_b \\ I_c \end{bmatrix} \quad \text{Eq. 5}$$

The currents in the α-β frame may be further transformed into a rotation frame, i.e., a d-q frame, at step block 104. The following equation describes this transformation:

$$\begin{bmatrix} i_d \\ i_q \end{bmatrix} = \begin{bmatrix} \cos(\omega_i t) & \sin(\omega_i t) \\ -\sin(\omega_i t) & \cos(\omega_i t) \end{bmatrix} \begin{bmatrix} i_\alpha \\ i_\beta \end{bmatrix} \quad \text{Eq. 6}$$

The resulting currents $i_d$, $i_q$ of the d-q frame are passed to a high pass filter (HPF) at step block 106. The transfer function of a first order high pass filter can be described by the following:

$$HPF(s) = \frac{s}{s + \omega_{hpf}} \quad \text{Eq. 7}$$

Where s is a Laplace operator, and $\omega_{hpf}$ is the corner frequency for the HPF. The corner frequency is at least several times lower than the fundamental frequency $\omega_i$, in one example.

The output signals from the HPF are defined as a new set of variables $i_{d\_hpf}$ and $i_{q\_hpf}$. These variables represent the filtered currents in the rotation frame. These signals are processed through a second rotation transformation (similar to the process described in Equation 6) at step block 108. The second rotation transformation can be expressed by the following:

$$\begin{bmatrix} i_{d2} \\ i_{q2} \end{bmatrix} = \begin{bmatrix} \cos(\omega_i t) & \sin(\omega_i t) \\ -\sin(\omega_i t) & \cos(\omega_i t) \end{bmatrix} \begin{bmatrix} i_{d\_hpf} \\ i_{q\_hpf} \end{bmatrix} \quad \text{Eq. 8}$$

The second rotation transformation generates new variables $i_{d2}$ and $i_{q2}$. These variables are passed to a low pass filter (LPF) at step block 110. The transfer function of a first order LPF is described by the following:

$$LPF(s) = \frac{\omega_{lpf}}{s + \omega_{lpf}} \quad \text{Eq. 9}$$

Where $\omega_{lpf}$ is the corner frequency for the LPF.

In one example, a low frequency (i.e., a few Hertz) is utilized for the LPF corner frequency in order to reduce unwanted noise. The entire filtering process of the three-phase currents is described in the block diagram of FIG. 4. Equations 5 through 9 generate a new set of variables representing rotational filtered current values $i_{d2\_lpf}$ and $i_{q2\_lpf}$. These current variables contain sine and cosine values of the rotor position. In one example, the rotor angular position can be calculated using an arc tangent function. In another example, the rotor angular position can be estimated using a phase lock loop (PLL).

Figure 5:
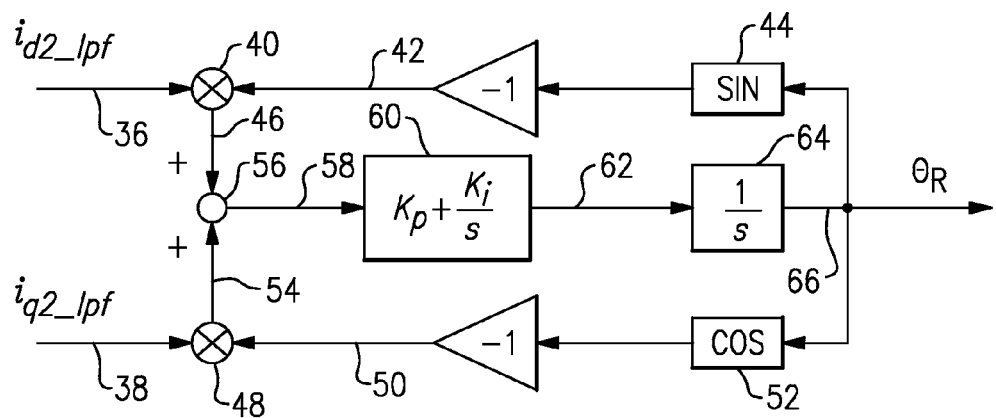
FIG. 5 illustrates a block diagram of how the system of FIG. 1 uses a phase lock loop (PLL) to obtain an estimated rotor angular position.

FIG. 5 represents how the controller 22 of the rotor angular position and start-up system 20 uses an example phase locked loop (PLL) to estimate the rotor angular position of the dynamoelectric machine 10. In FIG. 5, $k_p$ and $k_i$ are the proportional and integral gains for the PLL, Sine and cosine are the trigonometric functions for sine and cosine and 1/s represents integration.

The filtered rotational current values $i_{d2\_lpf}$ and $i_{q2\_lpf}$ are applied to signal paths 36 and 38. A multiplier 40 multiplies the rotational current value $i_{d2\_lpf}$ with a feedback signal on a signal path 42 from a sine function 44 to produce a d axis multiplier output signal on a signal path 46. Likewise, a multiplier 48 multiplies the rotational current value $i_{q2\_lpf}$ with a feedback signal on a signal path 50 from a cosine function 52 to produce a q axis multiplier output signal on a signal path 54.

A summer 56 adds the output signal on signal path 46 with the output signal on signal path 54 to produce a summed signal on a signal path 58. A proportional and integral (PI) regulator function 60 multiplies the summation signal on signal path 58 by the function $k_p + k_i/s$ to produce a PI output signal on signal path 62. An integral function 64 multiplies the PI output signal on the signal path 62 by the function 1/s to produce an integration output signal on signal path 66 that represents the rotor angular position $\theta_r$. The integration output signal on the signal path 66 is also fed into the inputs of the sine function 44 and the cosine function 52 to provide the PLL.

Figure 6:
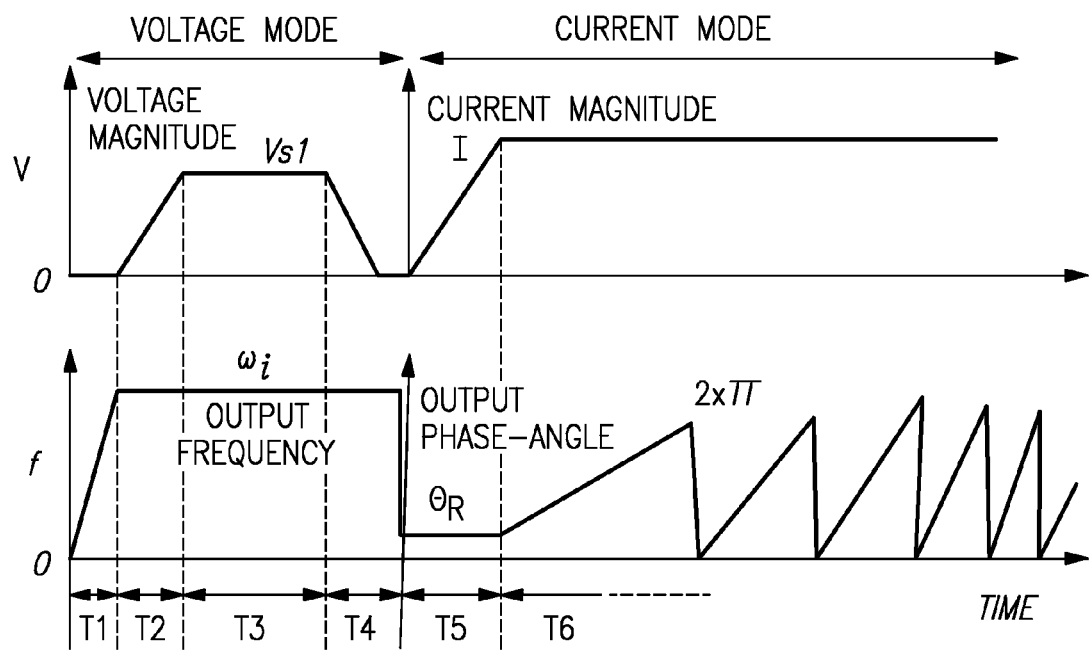
FIG. 6 illustrates a graphical representation of an example sequence for initial rotor angular position detection and start-up of a dynamoelectric machine.

FIG. 6 graphically illustrates an example sequence of the proposed method for initial rotor angular position detection and open loop start-up of a dynamoelectric machine 10. The graphs illustrated in FIG. 6 represent voltage (top graph) and frequency (bottom graph), respectively, as a function of time. During a time period $T_1$, the inverter 24 ramps up its output frequency from 0 to $\omega_i$. In one example, $\omega_i$ is 400 Hz. Next, at a time period $T_2$, the output voltage amplitude ramps from 0 to a set point, $V_{s1}$. During a time period $T_3$, the output voltage amplitude and frequency are each in a steady state. The currents $i_a$, $i_b$ and $i_c$ can be measured and used to estimate the rotor angular position during this period by utilizing the algorithm described by equations 5-9 and the PLL described in FIG. 5.

Once the rotor angular position $\theta_r$ has been detected, the output voltage ramps down its amplitude and frequency to 0, as is shown in time period $T_4$. At the end of time period $T_4$, the inverter 24 changes its control mode from a voltage mode to a current mode. Next, at time period $T_5$, the inverter increases the output current magnitude to a given level while maintaining the phase angle the same as the detected rotor angular position $\theta_r$.

Subsequent to time period $T_5$, the graphs illustrated in FIG. 6 represent current (top graph) and angle (bottom graph), respectively. The phase angle of the output current begins to increase during a time period $T_6$, thus accelerating the machine 10 to a command speed level. This is known as open-loop start-up since no actual rotor speed and position are measured for control Once the machine 10 starts to spin and reaches a certain speed, a different control strategy, such as a sensorless field oriented control, can be used to achieve better control performance, for example. This can be done by the selector switch 39 (See FIG. 2) switching between the output of the open loop start-up block 33 to the sensorless estimation block 35.

The foregoing description shall be interpreted as illustrative and not in any limiting sense. A worker of ordinary skill in the art would understand that certain modifications would come within the scope of this disclosure. For that reason, the following claims should be studied to determine the true scope and content of this invention.

What is claimed is:

1. A method for detecting an initial rotor angular position and starting a dynamoelectric machine having a stator and a rotor, comprising the steps of:
   a) driving the dynamoelectric machine into partial magnetic saturation to determine the initial rotor angular position of the dynamoelectric machine; and
   b) starting the dynamoelectric machine utilizing the initial rotor angular position determined at said step (a).

2. The method as recited in claim 1, wherein the dynamoelectric machine is a surface mounted permanent magnetic motor.

3. The method as recited in claim 1, wherein said step b) includes starting the dynamoelectric motor using an open-loop starting procedure.

4. The method as recited in claim 1, wherein said step a) includes the steps of:
   applying a multiple-phase voltage to the dynamoelectric motor at a standstill;
   measuring currents associated with the applied multiple-phase voltages;
   filtering the measured currents; and
   applying a phase-locked loop to the filtered currents to estimate the initial rotor angular position.

5. The method as recited in claim 4, wherein the applied multiple-phase voltage is a three-phase alternating current voltage.

6. A method for detecting an initial rotor angular position of a dynamoelectric machine, comprising the steps of:
   a) supplying a voltage to each of a plurality of windings of the dynamoelectric machine while at standstill;
   b) measuring a current associated with the voltage of each of the plurality of windings;
   c) filtering the currents measured in said step b); and
   d) applying a phase-locked loop to each current filtered in said step c) to estimate the initial rotor angular position.

7. The method as recited in claim 6, wherein the dynamoelectric machine is a surface mounted permanent magnetic motor.

8. The method as recited in claim 6, comprising the step of:
   e) transforming the voltages and currents to a stationary frame to produce transformed voltages and transformed currents.

9. The method as recited in claim 8, wherein the stationary frame is a two-phase $\alpha$-$\beta$ frame having an $\alpha$-axis and a $\beta$-axis, and the first transformed current is $I_\alpha$, the second transformed current is $I_\beta$, the first transformed voltage is $V_\alpha$, and the second transformed potential is $V_\beta$.

10. The method as recited in claim 9, wherein said step c) includes the steps of:
    transforming the currents in the stationary frame to a first rotation frame to obtain first rotational transformed currents;
    passing the first rotational transformed currents through a high pass filter to obtain filtered output signals;
    transforming the filtered output signals to a second rotation frame to obtain second rotational transformed currents; and
    passing the second rotational transformed currents through a low pass filter to obtain second filtered output signals.

11. The method as recited in claim 10, wherein said step d) comprises the steps of:
    multiplying one of the second filtered output signals with a sine function feedback signal to produce an $\alpha$-axis multiplier output signal;
    multiplying another of the second filtered output signals with a cosine function feedback signal to produce an $\beta$-axis multiplier output signal;
    adding the $\alpha$-axis multiplier output signal to the $\beta$-axis multiplier output signal to produce a summed signal;
    multiplying the difference signal by a proportional and integral regulator function $$K_p + \frac{K_i}{s}$$

to produce a PI output signal, wherein $K_p$ is a constant value corresponding to a proportional gain of the proportional and integral regulator function, $K_i$ is a constant value corresponding to an integral gain of the proportional and integral regulator function, and s is a Laplace operator;
    multiplying the PI output signal by an integral function $$\frac{1}{s}$$

to produce an integration output signal;
    multiplying the integration output signal by a sine function to produce the sine feedback signal; and
    multiplying the integration output signal by a cosine function to produce the cosine feedback signal, wherein the estimated initial rotor angular position for the dynamoelectric machine is derived from the proportional and integral regulator function output signal and the integration output signal.

12. The method as recited in claim 6, comprising the step of:
    e) starting the dynamoelectric machine in response to sensing the estimated initial rotor angular position.

13. The method as recited in claim 12, wherein the dynamoelectric machine is started using an open-loop start-up procedure.

14. A rotor angular position and start-up system for a dynamoelectric machine, comprising:
    a power inverter that communicates a voltage to said dynamoelectric machine; and
    a microcontroller programmed with a plurality of algorithms that drive said dynamoelectric machine into partial magnetic saturation to derive an initial rotor angular position of said dynamoelectric machine.

15. The system as recited in claim 14, comprising an EMI filter that receives and filters said voltage.

16. The system as recited in claim 14, wherein said voltage is a three-phase alternating current voltage.

17. The system as recited in claim 14, wherein said dynamoelectric machine is a surface mounted permanent magnetic motor.

18. The system as recited in claim 14, wherein said microcontroller includes an initial position detection block, an open-loop start-up block, a sensorless estimation block, a field oriented control block, a PWM gate control block and a state control logic block.

19. The system as recited in claim 14, wherein said microcontroller is operable to utilize said initial rotor angular position to start said dynamoelectric machine.

* * * * *